(12) United States Patent
Johnson

(10) Patent No.: US 7,857,882 B1  
(45) Date of Patent: Dec. 28, 2010

(54) WATER AND OIL MIST ELIMINATION APPARATUS FOR A VEHICULAR COMPRESSED AIR STORAGE SYSTEM

(75) Inventor: Truman G. Johnson, Urbana, OH (US)

(73) Assignee: Johnson Welded Products Inc., Urbana, OH (US)

( * ) Notice: Subject to any disclaimer, the term of this patent is extended or adjusted under 35 U.S.C. 154(b) by 229 days.

(21) Appl. No.: 12/316,422

(22) Filed: Dec. 12, 2008

Related U.S. Application Data

(60) Provisional application No. 61/007,567, filed on Dec. 13, 2007.

(51) Int. Cl.  
    *B01D 50/00* (2006.01)

(52) U.S. Cl. ............. 55/385.3; 55/447; 55/466; 55/525; 55/DIG. 17

(58) Field of Classification Search ........ 55/385.3, 55/447, 466, 525, DIG. 17  
See application file for complete search history.

(56) References Cited

U.S. PATENT DOCUMENTS

| | | | |
|---|---|---|---|
| 4,692,175 A | 9/1987 | Frantz | |
| 4,806,134 A | 2/1989 | Lhota | |
| 4,830,056 A | 5/1989 | Chamberlain | |
| 5,002,593 A * | 3/1991 | Ichishita et al. | ........... 96/137 |
| 5,334,230 A | 8/1994 | Sloka | |
| 5,779,772 A | 7/1998 | Unger et al. | |
| 5,792,245 A | 8/1998 | Unger et al. | |
| 5,986,546 A | 11/1999 | Kramer | |
| 6,581,297 B1 | 6/2003 | Ginder | |
| 6,786,953 B2 | 9/2004 | Fornof et al. | |
| 6,923,845 B2 | 8/2005 | Nichols et al. | |
| 6,951,581 B2 | 10/2005 | Fornof et al. | |
| 7,194,345 B2 | 3/2007 | Heer | |
| 2006/0123743 A1 | 6/2006 | Heer | |

\* cited by examiner

*Primary Examiner*—Robert A Hopkins  
(74) *Attorney, Agent, or Firm*—Mark A. Navarre

(57) ABSTRACT

A moisture removal apparatus for a vehicular compressed air storage system includes a canister of mist-eliminating mesh that collects moisture and oil droplets in the air and exhausts them through a gravity drain. The mesh coalesces droplets of both water and oil vapor in the air stream, and is not contaminated by either. The mist eliminating canister can be a stand-alone device through which compressed air is delivered to a pressure tank, or may be integrated into a pressure tank for space efficiency.

8 Claims, 3 Drawing Sheets

WATER AND OIL MIST ELIMINATION APPARATUS FOR A VEHICULAR COMPRESSED AIR STORAGE SYSTEM

RELATED APPLICATIONS

This application claims the benefit of provisional U.S. Patent Application Ser. No. 61/007,567, filed Dec. 13, 2007.

TECHNICAL FIELD

The present invention relates to a vehicular compressed air storage system, for operating air brakes for example, and more particularly to an apparatus for removing excessive moisture from the stored air.

BACKGROUND OF THE INVENTION

Commercial vehicles are commonly equipped with a compressed air storage system for operating air brakes and other pneumatically activated devices. An air compressor driven by the vehicle engine supplies compressed air to one or more storage vessels, which in turn are coupled to the air brakes and other pneumatically activated devices. Since excessive ambient moisture in the compressed air can be harmful to air brakes and other pneumatically activated devices, most compressed air storage systems include a moisture removal mechanism.

One of the most common and cost effective ways to remove moisture from a compressed air storage system is to drive the compressed air through a desiccant material such as silica gel or active alumina that adsorbs moisture on its surface. At some point, the desiccant material becomes saturated and the adsorbed water must be removed through a regeneration procedure. However, the problem with this approach is that air supplied by an oil-lubricated compressor invariably contains a certain amount of blow-by oil mist that contaminates the desiccant material so that it will no longer adsorb moisture or regenerate. This condition can be forestalled to some degree by installing an oil filter upstream of the desiccant, but both the oil filter and the desiccant material must, as a practical matter, be periodically replaced to keep the brakes and other pneumatically activated devices free of excessive moisture. Accordingly, what is needed is a more reliable and maintenance-free apparatus for removing excessive moisture in a motor vehicle compressed air storage system.

SUMMARY OF THE INVENTION

The present invention is directed to an improved vapor droplet removal apparatus for a motor vehicle compressed air storage system in which potentially moisture-laden air supplied to a canister by an oil-lubricated compressor is passed through a mist-eliminating mesh that removes moisture and oil mist in the air. The mesh coalesces droplets of both water vapor and oil vapor in the air stream, and is not contaminated by either. The coalesced moisture and oil are collected in a sump area of the canister, and are periodically exhausted through an electrically activated drain. The drain may be a gravity drain installed in the sump area, but is preferably a siphon drain installed in a dry portion of the canister. The canister may be a stand-alone device through which compressed air is delivered to a separate pressure tank, or may be integrated into a pressure tank for space efficiency.

DESCRIPTION OF THE PREFERRED EMBODIMENT

Figure 1:
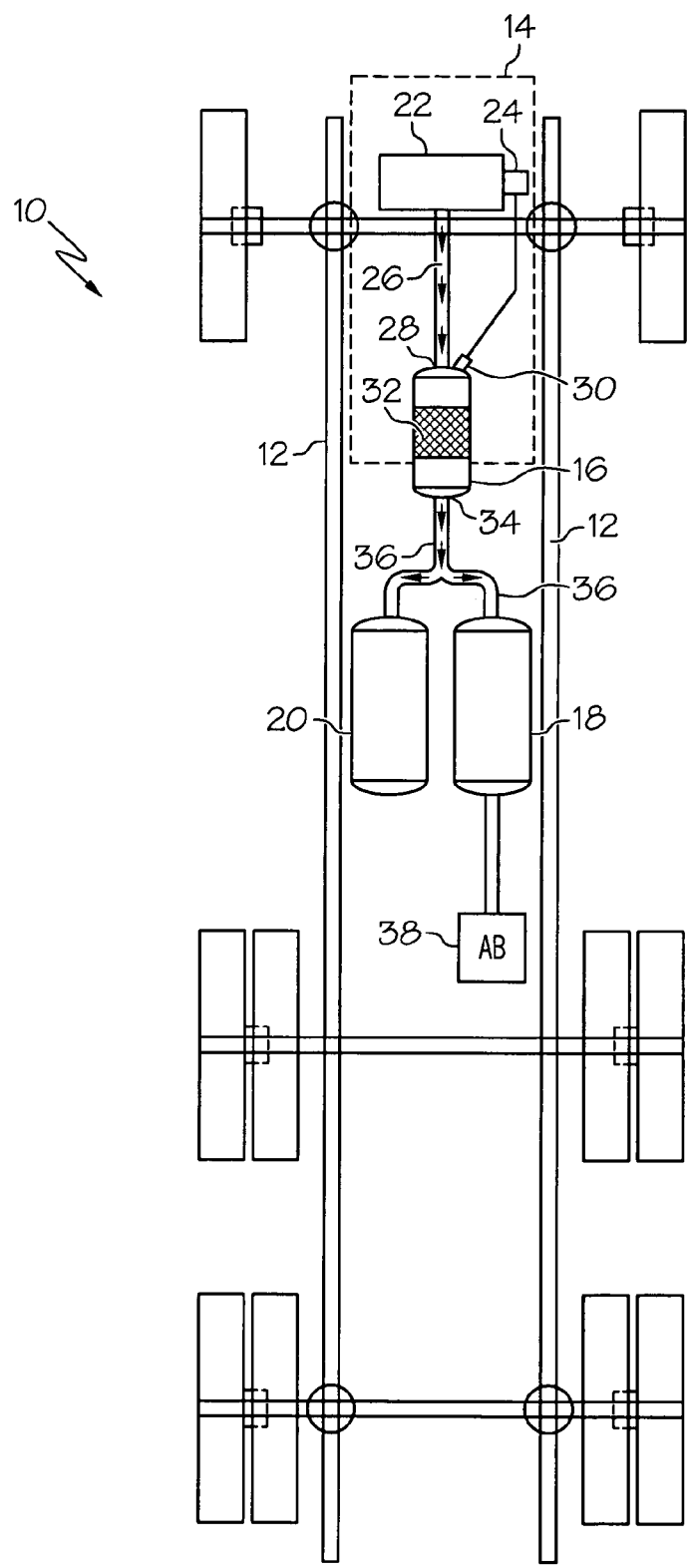
FIG. 1 is a diagram of a vehicle compressed air storage system including a stand-alone mist elimination canister according to a first embodiment of this invention.

Referring to FIG. 1, the reference numeral 10 generally designates a commercial truck such as a semi-tractor. The frame 12 of the tractor 10 supports the powertrain 14 and various air storage system canisters 16-20. The air storage system includes a compressor 22, a stand-alone mist elimination canister 16, a primary air storage tank 18, and a secondary air storage tank 20. In a typical application, the compressor 22 is an engine-driven component, and includes a pneumatically operated unloading or bypass device 24 for controlling the compressor load to regulate the air pressure in one or more of the canisters 16-20. Alternately, the compressor 22 may be driven an electric or hydraulic motor with a speed or on/off control for controlling the compressor load.

In the embodiment of FIG. 1, the air hose 26 couples the output of compressor 22 to the inlet 28 of a mist elimination canister 16. A governor 30 responsive to the pressure in canister 16 is coupled to the compressor-unloading device 24 to regulate the air pressure in canister 16 to a prescribed pressure range. The air supplied to canister 16 flows through a mist elimination mesh 32 disposed within the canister 16, and the de-misted air is then delivered from the canister outlet 34 to the primary and secondary canisters 18 and 20 by one or more air hoses 36. Typically, the canisters 18 and 20 include inlet check valves (not shown) for preventing leakage of the stored air in the event of an upstream pressure loss. The primary canister 18 supplies pressurized air to an air brake controller 38, and the secondary canister 20 supplies pressurized air to other pneumatically activated devices such as load levelers, air horns, and so on.

Figure 2:
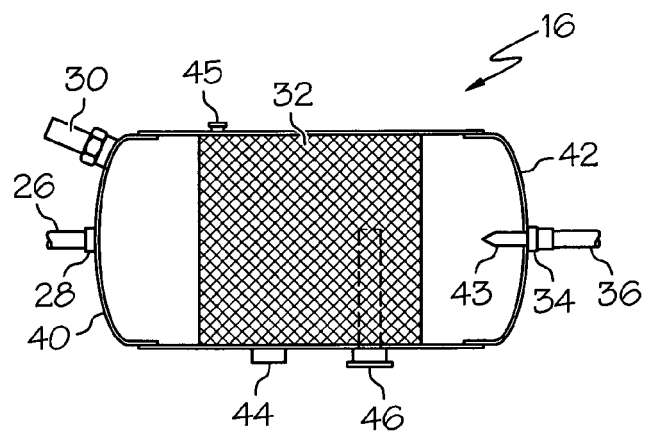
FIG. 2 depicts the stand-alone mist elimination canister of FIG. 1.

FIG. 2 shows the mist elimination canister 16 of FIG. 1 in further detail. Referring to FIG. 2, the mist elimination mesh 32 is preferably disposed in a central portion of canister 16 intermediate the two end caps 40 and 42. The governor 30 and a safety relief valve 45 are located upstream of the mist elimination mesh 32, and a screen 43 is disposed downstream of the mist elimination mesh 32 at the canister outlet 34. Coalesced water vapor and oil vapor is purged from the canister 16 by a manual drain 44 and/or an automatic drain 46 that is remotely activated. The mist elimination mesh 32 preferably comprises a loosely intertwined weave of fine metal wire with multi-filament yarn knitted into the weave. A suitable material is commercially available from Knitwire Products or Amistco Separation Products, Inc. Minute particles of oil and water dispersed in the inlet air collect on the surface of the mesh 32 and coalesce into droplets and flow to the bottom of the canister 16 where they are purged through the drains 44 and/or 46. The air exiting the canister outlet 34 is substantially free of oil vapor and water vapor particles, and is supplied to the primary and secondary canisters 18 and 20 as dry air suitable for use in air brakes and other pneumatically activated devices.

Figure 3A:
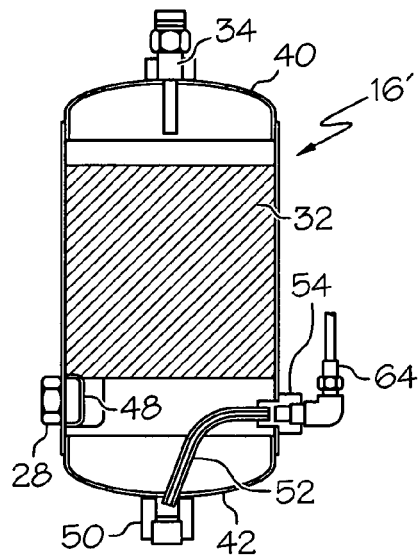
FIG. 3A depicts a stand-alone mist elimination canister according to a second embodiment of this invention.
Figure 3B:
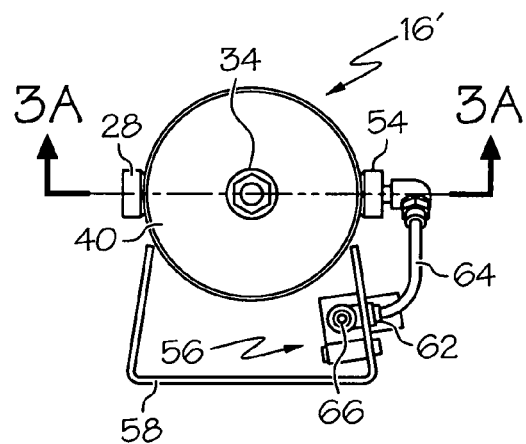
FIG. 3B is a top view of the stand-alone mist elimination canister of FIG. 3A.
Figure 3C:
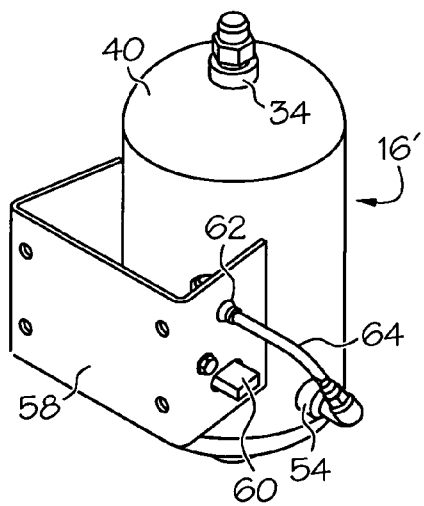
FIG. 3C is an isometric view of the stand-alone mist elimination canister of FIG. 3A.

FIGS. 3A-3C depict a second embodiment of a stand-alone mist elimination canister 16' that is configured for vertical installation instead of horizontal. This embodiment differs from the embodiment of FIGS. 1-2 in at least three other respects as well. First, the governor 30 and safety relief valve 45 are omitted; second, the automatic gravity drain 46 of the first embodiment is replaced with an automatic siphon drain; and third, an internal baffle is added to enhance mist elimination.

Referring to FIGS. 3A-3C, the mist elimination mesh 32 is disposed in a central portion of canister 16' intermediate the upper and lower end caps 40 and 42. High pressure air from compressor 22 enters canister 16' via an inlet 28 located below the mist elimination mesh 32, and is directed laterally along the inner periphery of the canister 16' by a baffle 48 disposed just below the mist elimination mesh 32. The baffle 48 imparts a swirling motion to the inlet air for improved mist elimination in the mesh 32, and additionally collects and drains off some of the moisture and oil vapor that comes out of suspension when it impacts the baffle surface. The vapor-laden air flows upward though the mist elimination mesh 32, and exits the canister 16' via an outlet 34 formed in the upper end cap 40. In this embodiment, the outlet 34 accommodates an internal screen for capturing any foreign matter.

The coalesced water vapor and oil vapor collects in a sump 50 formed in the lower end cap 42, and is periodically purged by an automatic siphon drain comprising a siphon tube 52, a through-fitting 54 formed in the side of the canister 16' opposite the inlet 28, and an electrically activated valve module 56. As seen in FIG. 3A, the siphon tube 52 is coupled to the internal end of through-fitting 54, and extends into the sump 50. As seen in FIGS. 3B-3C, canister 16' includes a bracket 58 for mounting the canister 16' on a suitable vehicle frame, and the valve module 56 is mounted on a leg of the bracket 58. The valve module 56 includes an electrical connector 60, an inlet port 62 coupled to the external end of through-fitting 54 by a suitable length of tubing 64, and an outlet port 66. Conveniently, the outlet port 66 can be coupled to a vented canister (not shown) so that the expelled water and oil can be collected and appropriately recycled. Since the valve module 56 is remote from the sump 50, it is easily accessible for maintenance, and is not subject to damage or deterioration from contact with frozen liquids.

Figure 4:
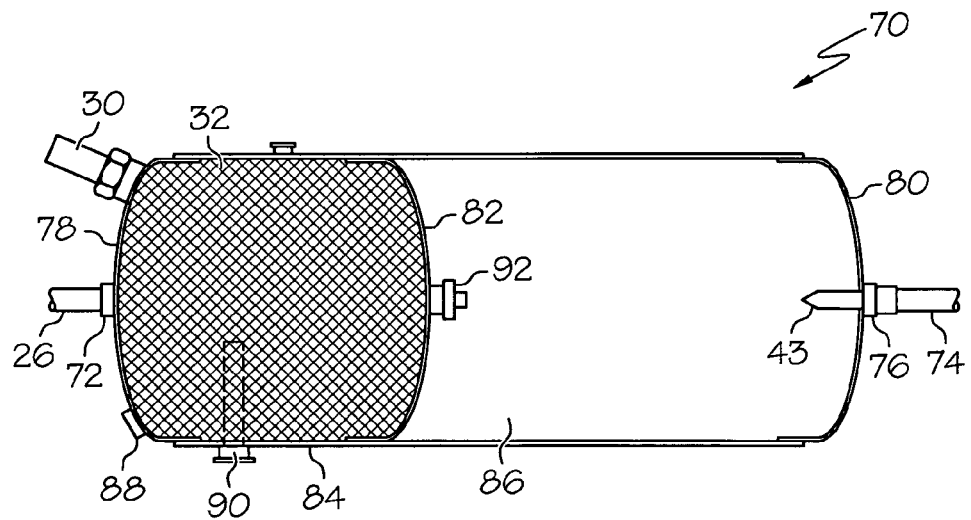
FIG. 4 depicts a combined pressure tank and mist elimination canister according to a third embodiment of this invention.

FIG. 4 depicts a multi-compartment canister 70 that combines the functionality of mist elimination canister 16 and primary (or secondary) canister 18 of FIG. 1. Reference numerals used in FIGS. 1-2 have been reused where appropriate. In this case, the air hose 26 from compressor 22 is coupled to the inlet 72 of canister 70, and an air hose 74 couples the outlet 76 of canister 70 to the secondary air storage canister 20. The inlet 72 is formed in end cap 78, the outlet 76 is formed in end cap 80, and a metal baffle 82 (a third end cap, for example) is welded to the inner periphery of the canister 70 intermediate the end caps 78 and 80 to form upstream and downstream compartments 84 and 86. The mist elimination mesh 32 is disposed in the upstream compartment 84 (i.e., the wet compartment), and coalesced oil and water is purged from compartment 84 by the manual and/or automatic drains 88 and 90. Air exiting the upstream compartment 84 enters the downstream compartment 96 through a check valve 92 mounted in the baffle 82. Thus the upstream compartment 84 serves the function of mist elimination canister 16 and the downstream compartment 86 serves the function of primary (or secondary) canister 18.

In summary, the present invention provides a reliable and maintenance-free apparatus for removing excessive moisture in a motor vehicle compressed air storage system. There are no oil filters or desiccant canisters to periodically replace, and proper operation of the system no longer depends upon adherence to a specified maintenance schedule. While the invention has been described with respect to the illustrated embodiment, it is recognized that numerous modifications and variations in addition to those mentioned herein will occur to those skilled in the art. For example, the siphon drain arrangement depicted in FIGS. 3A-3C may be used with the other canister embodiments, and so forth. Accordingly, it is intended that the invention not be limited to the disclosed embodiment, but that it have the full scope permitted by the language of the following claims.

The invention claimed is:

1. A motor vehicle compressed air storage system comprising in combination:
   an oil lubricated air compressor for delivering compressed inlet air subject to moisture and oil mist inclusion;
   at least one compressed air storage tank including a reservoir coupled to a pneumatically activated device of the vehicle; and
   a canister of mist-eliminating mesh integrated into said compressed air storage tank for receiving air delivered by said compressor for collecting and coalescing water and oil particles suspended in the inlet air to provide substantially moisture-free and oil-free outlet air to said reservoir.

2. The motor vehicle compressed air storage system of claim 1, where:
   said compressed air storage tank includes an upstream compartment in which said mist-eliminating mesh is disposed, and a downstream compartment for storing said outlet air.

3. The motor vehicle compressed air storage system of claim 2, further comprising:
   a baffle separating said upstream compartment and said downstream compartment; and
   a check valve mounted in said baffle for coupling said upstream compartment to said downstream compartment.

4. A motor vehicle compressed air storage system comprising in combination:
   an oil lubricated air compressor for delivering compressed inlet air subject to moisture and oil mist inclusion;
   at least one compressed air storage tank including a reservoir coupled to a pneumatically activated device of the vehicle; and
   a canister of mist-eliminating mesh for receiving air delivered by said compressor for collecting and coalescing water and oil particles suspended in the inlet air to provide substantially moisture-free and oil-free outlet air to said reservoir, said canister being mounted in a vertical orientation, with the mist-eliminating mesh disposed in a central portion of said canister, said inlet air being received by said canister at an inlet port disposed in a lower portion of said canister below said mist-eliminating mesh, and said outlet air being delivered to said reservoir through an outlet port disposed in an upper portion of said canister above said mist-eliminating mesh.

5. The motor vehicle compressed air storage system of claim 4, where:

said canister includes a baffle inboard of said inlet port such that said inlet air impacts said baffle to impart a swirling motion to said inlet air within said canister, and to coalesce and collect some of the moisture and oil mist present in said inlet air.

6. The motor vehicle compressed air storage system of claim 4, further comprising:

a sump formed in the lower portion of said canister in which the coalesced water and oil particles are collected; and a drain apparatus for automatically and periodically draining the collected water and oil particles.

7. The motor vehicle compressed air storage system of claim 6, where:

said drain apparatus includes an external valve module and a siphon tube that passes through a side-wall of said canister for draining the collected water and oil particles through said external valve module, said siphon tube having a first end disposed in said sump, and a second end coupled to an inlet port of said external valve module.

8. The motor vehicle compressed air storage system of claim 7 where:

said canister includes a bracket for mounting said canister on a motor vehicle, and said external valve module is mounted on a leg of said bracket.

* * * * *